RECORD-REPRODUCE PHONOGRAPHIC SYSTEM

Filed Feb. 4, 1957

INVENTOR
George W. Esser
By: George H. Fritzinger
Agt.

United States Patent Office 2,984,708
Patented May 16, 1961

2,984,708

RECORD-REPRODUCE PHONOGRAPHIC SYSTEM

George W. Esser, West Orange, N.J., assignor to McGraw-Edison Company, Elgin, Ill., a corporation of Delaware Filed Feb. 4, 1957, Ser. No. 638,046

5 Claims. (Cl. 179—100.1)

This invention relates to phonographic equipment which is selectively operable to record or reproduce, and more particularly it relates to the provision of a simplified control circuitry for selectively conditioning such system from a remote station. The invention is especially intended for use in dictation equipment and is herein described in connection therewith without intending, however, any unnecessary limitation thereto.

Dictation-recording and -reproducing equipment is provided typically with a single record-reproduce amplifier and with a record-reproduce change-over switch for interchanging the audio circuit connections of the amplifier with respect to the record-cooperating translating heads and the receiver-microphone. Such change-over switch is necessarily of a multiple-pole type which must be of a well-built, shielded construction to provide good electrical contact and avoid feedback between the output and input circuits of the amplifier. In order to enable such switch to be located in the vicinity of the amplifier and to reduce the number of wires which must be led between the dictator's station and the amplifier equipment, while yet enabling the switching to be controlled from the dictator's station, the change-over switch is made a part of a relay. It is found in practice that this relay is a troublesome component which requires frequent servicing to maintain it in good working order. It is an object of this invention to provide an improved phonographic system which does not require such change-over record-reproduce switch or relay.

My invention is carried out in its most preferred form with the use of one or more stages of audio amplification of the transistor type. Since transistor amplifiers are immediately operative as soon as $E_{cc}$ voltage is supplied thereto, and this $E_{cc}$ voltage is of only a few volts, there is achieved by use of one or more transistorized stages of amplification the ability to exchange switching of unshielded high-level audio or power circuits in place of shielded, low-level audio circuits. This permits all circuit switching to be done manually at the dictator's station with the use of only standard low-cost unshielded switches without need for the usual record-reproduce relay.

Other objects and features of my invention will be apparent from the following description and the appended claims.

Figure 1:
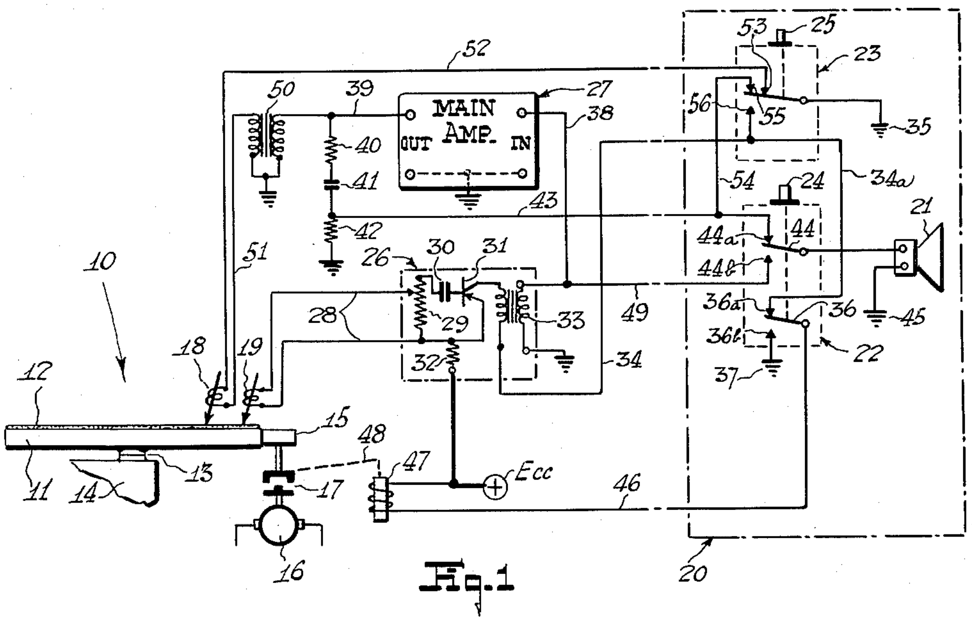
Figure 2:
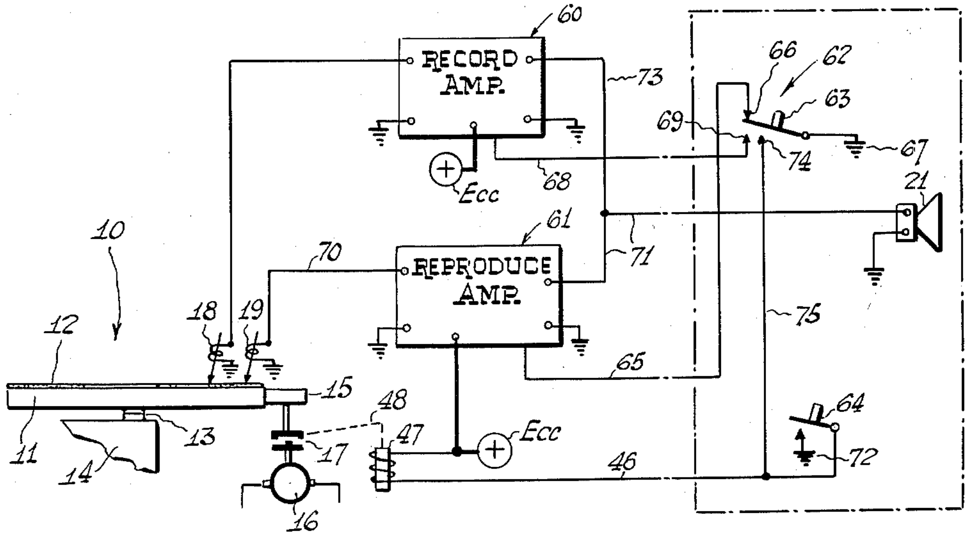

In the description of my invention reference is had to the accompanying drawings, of which:

Figure 1 is a schematic diagram showing circuits and apparatus of a phonograph system embodying my invention; and Figure 2 is a schematic diagram showing circuits and apparatus of a phonographic system according to a second embodiment of my invention.

In the embodiment of my invention shown in Figure 1 there is a phonographic mechanism 10 shown fractionally as including a turntable 11 for a disk record 12. The turntable is journaled at 13 in a frame 14 fractionally indicated. The periphery of the turntable is engaged by a friction drive wheel 15 driven by a motor 16 through a clutch 17. Engaging the record is a recorder head 18 and a reproducer head 19. These heads are mounted on a suitable carriage (not shown) for movement in an inward radial direction as the turntable is rotated, but the carriage drive mechanism for these heads is standard in dictating machines and need not be herein shown. In order to permit a "quick review" at any time of a last portion of one's dictation without having to backspace the carriage, the reproducer head is set typically at a small trailing distance behind the recorder head as indicated.

The dictator's station equipment, generally referred to as 20, comprises a receiver and microphone preferably provided as a unitary transducer unit 21, and two separate control switches 22 and 23. The switch 22 is of the double-pole double-throw type biased into a position for reproducing and operable by the pushbutton 24 into a recording position. The switch 23 is of the single-pole type biased into the position shown and operable by the pushbutton 25 into a reproducing position.

The amplifier equipment at the machine comprises a pre-amplifier 26 of the transistorized type and a main or recording amplifier 27 which may be of the standard electronic-tube type. The pre-amplifier and main amplifier in series constitute the reproduce amplifier of the system but only the main amplifier 27 is used for recording. The reproducer head 19 is connected by leads 28, an input volume control 29, and a blocking condenser 30 across the base and emitter elements of a transistor 31 of the pre-amplifier. The emitter is supplied with D.C. voltage through a resistor 32 from a source marked $E_{cc}$. A signal from the reproducer head applied between the base and emitter produces an amplified signal between the emitter and collector through a primary winding of an output transformer 33. The emitter-collector circuit is normally open to render the transistor stage normally inoperative but is completed through a lead wire 34 to the dictator's station and then through the switch 23 to ground at 35 when the pushbutton 25 is depressed, it being understood that the circuit is completed through ground to the negative side of the $E_{cc}$ supply voltage. The main amplifier 27 and motor 16 are controlled as by a suitable master switch (not shown) which is closed to render these units operative as whenever the system is to be in a standby condition. A lead wire 38 connects the output of the pre-amplifier to the input of the main amplifier, it being considered for simplificaiton of description that the return of this circuit is through ground as indicated. The output of the main amplifier is connected through a lead wire 39, resistor 40 and condenser 41 across a load resistor 42 and back through ground as indicated. A lead wire 43 connects the high-potential side of the load resistor 42 through contact 44*a* and pole 44 of the switch 22 to one terminal of the receiver-microphone 21, the other terminal of which is grounded at 45 to complete the return circuit. Thus, in the normal position of the dictator's control switches 22 and 23, the reproducer head is connected through the pre-amplifier 26 and main amplifier 27 to the receiver-microphone 21; however, the pre-amplifier is in an inoperative condition by reason of its emitter-collector circuit being open at the switch 23.

Upon the dictator pressing the button 25 to operate the switch 23, the power circuit to the pre-amplifier 26 is completed to render this pre-amplifier operative, and also a circuit 46 including a clutch electromagnet 47 is completed from the voltage source $E_{cc}$ to ground through a pole 36 and associated contact 36*a* of the switch 22, lead 34*a* and switch 23 to ground. The clutch electromagnet 47 is connected mechanically as represented by the tie line 48 to the clutch 47 to cause the clutch to be engaged to start record rotation whenever the clutch electromagnet is energized.

When the dictator wishes to record, he simply presses the button 24 to operate the switch 22 while the switch 23 is in its normal released position. Upon so doing, the clutch electromagnet is again energized from the voltage source $E_{cc}$ through lead wire 46 now completed through pole 36 and associated contact 36*b* to ground at 37. Also, the pole 44 is made with contact 44*b* to connect the receiver-microphone 21, acting as a microphone, through lead wire 49 and lead wire 38 to the input of the main amplifier. The playback circuit of the main amplifier to the receiver-microphone 21 through the lead wire 43 aforementioned is now broken because the pole 44 of the switch 22 is disengaged from the contact 44*a*, but an alternative output circuit is now completed through the recorder head 18 by reason of the switch 23 being in its released position. This alternative circuit is made through output lead 39, output transformer 50, lead wire 51, recorder head 18, lead wire 52 and contact 53 of switch 23 to ground at 35. Also, in the released position of the switch 23 the reproducer output lead 43 is grounded through lead wire 54 and contact 55 to ground at 35 so as to prevent possible oscillation of the main amplifier due to feedback especially during the first instant following release of the switch 23. Dictation spoken into the transducer 21 will now be amplified by the main amplifier 27 and fed through the output transformer 50 to the recorder head whereat it will be recorded on the rotating disk record. At any time during the recording operation the dictator can stop the machine simply by releasing the switch 22. He may next either resume recording by repressing the switch 22, or he may listen to the last portion of his recorded dictation by pressing the switch 23 while the switch 22 is in released position. Upon pressing the switch 23, the following sequence of operations occurs: the switch pole breaks with the recorder circuit at the contact 53, the switch pole makes with the contact 56 to engage the clutch and supply power to the transistor amplifier 26, and the switch pole breaks with the contact 55 to remove the ground connection from the playback circuit.

In the foregoing system there is only one low-level audio circuit between the machine and the dictator's station, which is the lead 49 forming the input circuit from the transducer 41 to the recording amplifier 27. The other leads comprise the high-level reproducer output circuit 43, the high-level record output circuit 52, the power circuit 34 for the transistor amplifier 36, and the power circuit 46 for the clutch electromagnet 47. Thus, there is a total of only five leads between the machine and the dictator's station without need for any record-reproduce relay such as is typically required.

In the embodiment of my invention shown in Figure 2 there are employed totally separate record and reproduce amplifiers 60 and 61, each of which may be totally transistorized so as to be normally inoperative but activatable instantaneously upon supply of $E_{cc}$ power thereto. The components, which may be the same as in the first embodiment, are given the same reference characters. Two control switches are provided again at the dictator's station—a single-pole double-throw switch 62 biased into reproduce position and depressible by a button 63 into a record position, and a single-pole single-throw switch 64 for starting the machine for reproducing.

When the abovementioned switches are in their normal positions as shown, the reproducer-amplifier 61 is activated by power from the terminal marked $E_{cc}$ through lead 65 and contact 66 of switch 62 to ground at 67, it being understood that the power supply is itself grounded to complete the circuit connection. The record amplifier is also connected to a source of power marked $E_{cc}$ but its power circuit is not now completed because the lead 68 of this circuit runs to an open contact 69 of the switch 62. The reproducer head 19 is connected permanently by a lead 70 to the input of the amplifier 61 and the output of this amplifier is connected by a lead 71 to the transducer 21, it being understood that each of these circuits is completed via ground as indicated. The reproducer audio circuit is thus in a normally operative condition. This is permissible in practice because the transistor amplifier 61 consumes no substantial power on stand-by. However, the record turntable is normally at standstill because of the open condition of the clutch 17. To start the machine for reproducing, the dictator simply closes the switch 64 to complete the power circuit for the clutch electromagnet 47 from the power supply marked $E_{cc}$ via lead wire 46 and switch 64 to ground at 72.

To put the system in operating condition for recording, the dictator need simply depress the switch 62 while the switch 64 is in released position. In so doing the power circuit 65 is broken to deactivate the reproducer amplifier 61 and the power circuit 68 is completed via the contact 69 and ground at 67 to activate the record amplifier 60 having its input connected via lead wires 73 and 71 to the transducer 21 acting now as a microphone; also, connection is made with the contact 74 of the lead wire 75 connected to the circuit 46 of the clutch electromagnet 47 to complete this circuit through ground 67 and cause the clutch to be engaged to start the machine. Thus, upon speaking into the transducer 21 acting as a microphone after depressing the switch 62, the voice signals from the microphone will be amplified by the record amplifier 60 and will be fed to the recorder head 18 whereat they will be recorded on the rotating disk record. To stop the machine at any time, the dictator need only release the switch 62, and if the dictator wishes to listen back to the last portion of his dictation he need only press the switch 64 or, if he wishes next to resume recording, he need only to re-press switch 62.

In my second embodiment hereinabove described, only four lead wires are required between the machine and the dictator's station and only one of these wires—the lead wire 71—need be shielded. Still further, only very simple control switches are required without need for the usual record-reproduce relay.

The embodiments of my invention hereinabove particularly shown and described are intended to be illustrative and not limitative of my invention since the same are subject to changes and modifications without departure from the scope of my invention, which I endeavor to express according to the following claims.

I claim:

1. A selectively-operable record-reproduce phonographic system comprising a phonographic mechanism including a rotatable support for a record, record-reproduce head means, drive means for said support, start-stop means for said drive means, a receiver-microphone, selective circuit means including amplifying means for differently interconnecting said head means and receiver-microphone to condition the system either for recording or reproducing, said amplifier means including a transistorized stage of amplification adapted to be immediately activatable for operation upon supply of voltage thereto, and unitary means for concurrently activating said transistorized amplifier stage and shifting said start-top means to start position.

2. A selectively-operable record-reproduce phonographic system comprising a main amplifier, a transistorized pre-amplifier having its output connected permanently to the input of said main amplifier and together adapted to form a playback amplifier, said pre-amplifier being normally without power supply, a receiver-microphone, a record-reproduce conditioning switch adapted also for starting the machine in record condition having a reproduce position for connecting said receiver-microphone acting as a receiver to the output of said main amplifier and having a record position for connecting the receiver-microphone acting as a microphone to the junction between said pre-amplifier and said main amplifier, a phonographic mechanism including a rotatable record support and drive means therefor, means coordinated with said switch as the switch is moved to record position for starting said record support when said receiver-microphone acting as a microphone is connected to the input of said main amplifier and for stopping said support when said switch is moved to reproduce position to connect said receiver-microphone acting as a receiver to the output of said main amplifier, means biasing said record-reproduce conditioning switch in reproduce position, a push type reproduce start switch, circuit means controlled by said conditioning and start switches for providing operating power to said preamplifier and for starting said record support upon pressing said start switch while said conditioning switch is in reproduce position and for removing power from said preamplifier and stopping said record support when said start switch is released, a record cooperable recording head, a reproduce head connected to the input of said preamplifier, and further circuit means controlled by said reproduce start switch as the switch is released for disabling the output connection of said main amplifier to said receiver-microphone and for connecting instead said recording head to the output of said main amplifier.

3. A selectively-operable record-reproduce system comprising separate record and reproduce amplifiers each of the transistorized type, a receiver-microphone connected permanently to the output of the reproduce amplifier and the input of the record amplifier, a recorder head connected to the output of said record amplifier, a reproducer head connected to the input of said reproduce amplifier, a source of power supply for said amplifiers, and circuit means including a selector switch for connecting said power supply to either of said amplifiers to activate the same while leaving the other disabled.

4. The system set forth in claim 3 including a phonographic mechanism having a rotatable support for a record, drive means for said support, a start-stop device for said drive means, means biasing said selector switch into one of its positions, means for activating said start-stop device to start position, and means associated with said selector switch for activating said start-stop device to start position when the selector switch is shifted to the other of its positions.

5. The combination set forth in claim 1 wherein said record-reproduce head means comprises separate record and reproduce heads, and said reproduce head is connected permanently to the input of said transistorized stage of amplification.

References Cited in the file of this patent

UNITED STATES PATENTS

| | | |
|---|---|---|
| 2,359,489 | Proctor | Oct. 3, 1944 |
| 2,409,520 | Thompson | Oct. 15, 1946 |
| 2,822,426 | Dinsmore | Feb. 4, 1958 |